(12) United States Patent
Hoersch et al.

(10) Patent No.: US 7,936,450 B2
(45) Date of Patent: May 3, 2011

(54) OPTO-ELECTRICAL SENSOR ARRANGEMENT

(75) Inventors: Ingolf Hoersch, Emmendingen (DE); Felix Lang, Schliengen (DE)

(73) Assignee: Sick AG, Waldkirch (DE)

( * ) Notice: Subject to any disclaimer, the term of this patent is extended or adjusted under 35 U.S.C. 154(b) by 352 days.

(21) Appl. No.: 11/896,285

(22) Filed: Aug. 30, 2007

(65) Prior Publication Data
US 2008/0074642 A1 Mar. 27, 2008

(30) Foreign Application Priority Data
Sep. 1, 2006 (DE) .......................... 10 2006 041 307

(51) Int. Cl.
*G01P 3/36* (2006.01)
(52) U.S. Cl. ........................................ 356/28; 356/28.5
(58) Field of Classification Search ............ 356/3.01–22
See application file for complete search history.

(56) References Cited

U.S. PATENT DOCUMENTS

| | | | | |
|---|---|---|---|---|
| H1409 H | * | 1/1995 | Bixler .......................... | 701/223 |
| 6,330,057 B1 | | 12/2001 | Lederer et al. | |
| 6,504,602 B1 | * | 1/2003 | Hinderling ..................... | 356/5.1 |
| 6,876,441 B2 | * | 4/2005 | Barker ......................... | 356/5.09 |
| 7,197,179 B2 | * | 3/2007 | Rubbert et al. ................ | 382/154 |
| 2002/0109829 A1 | * | 8/2002 | Hayes ......................... | 356/4.01 |
| 2004/0221790 A1 | * | 11/2004 | Sinclair et al. ................ | 116/62.1 |
| 2005/0024623 A1 | * | 2/2005 | Xie et al. .................... | 356/3.01 |
| 2005/0057492 A1 | | 3/2005 | Bathiche et al. | |
| 2005/0168445 A1 | | 8/2005 | Piot et al. | |
| 2005/0179908 A1 | | 8/2005 | Wada et al. | |
| 2008/0144978 A1 | * | 6/2008 | Yourlo et al. ................. | 382/321 |

FOREIGN PATENT DOCUMENTS

| | | |
|---|---|---|
| DE | 197 30 341 A1 | 1/1999 |
| DE | 103 06 417 B4 | 4/2004 |
| EP | 1 569 081 A2 | 8/2005 |
| EP | 1 586 857 A1 | 10/2005 |

OTHER PUBLICATIONS

Mouchtaris, A., et al., "Inverse Filter Design for Immersive Audio Rendering Over Loudspeakers", *IEE Transaction on Multimedia*, vol. 2, No. 2, pp. 77-87, (Jun. 2000).

* cited by examiner

*Primary Examiner* — Thomas H Tarcza
*Assistant Examiner* — Luke D Ratcliffe
(74) *Attorney, Agent, or Firm* — The Nath Law Group; Jerald L. Meyer; Stanley N. Protigal

(57) ABSTRACT

The invention relates to an opto-electronic sensor arrangement (10) with an optical transmitter (20) and an optical receiver (30), such that the optical transmitter (20) and the optical receiver (30) are so positioned that they either form an optical scanner designed as an optical scanner with background gating or form a reflecting light barrier in conjunction with a reflector (60), and such that the optical receiver (30) has a detector (32) in which successive images of the light beam (30*a*) reflected from the object (50) are detected and are compared in an evaluating unit (36), and the outcome of the comparison provides information on the movement of the object (50) relative to the optical receiver (30), so that the detector exercises a movement function.

24 Claims, 1 Drawing Sheet

OPTO-ELECTRICAL SENSOR ARRANGEMENT

Figure 1:
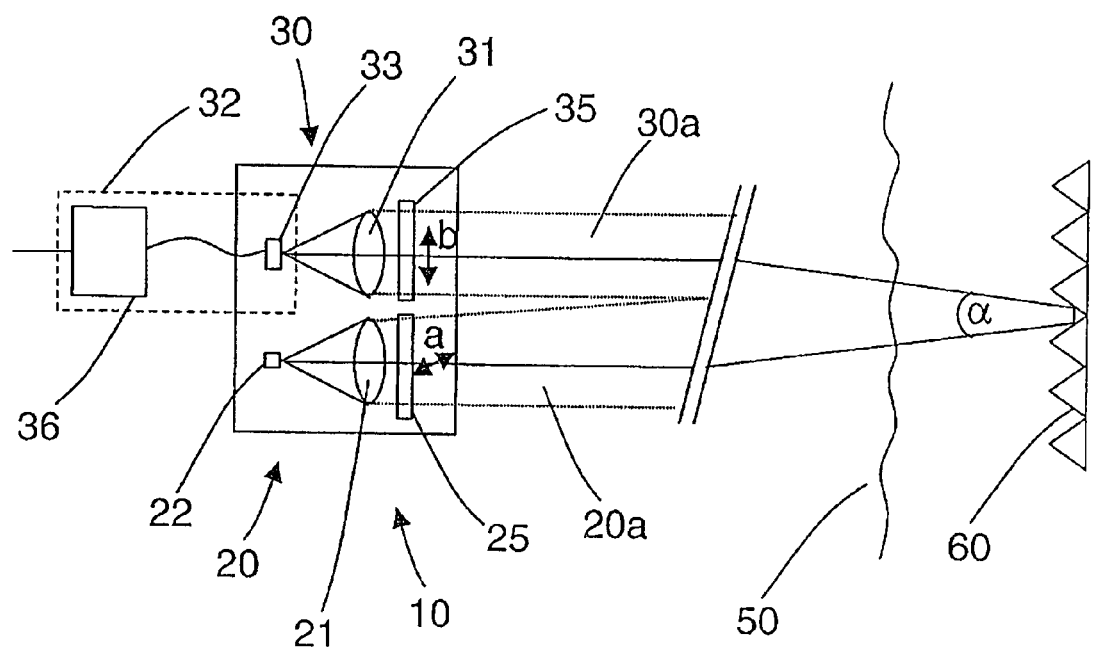

The invention relates to an opto-electrical sensor arrangement.

Known opto-electronic sensor arrangements exhibit an optical transmitter and an optical receiver, which are so positioned relative to each other that a light beam reflected by an object is received by the optical receiver. The light beam sent out by the optical transmitter and that detected by the optical receiver often meet at an angle of more than 45° in the image plane of the object, so that the optical transmitter and the optical receiver must be positioned at an angle to each other and at a specific, predetermined distance from the reflecting object.

A disadvantage imposed by this angular positioning of the optical transmitters and receivers rests in the fact that they must lie at a pre-determined distance from the object they detect and their operation is dependent on that distance.

In this case, the known electro-optical sensor arrangements—for example, reflecting light barriers—basically detect the presence of an object.

Known from U.S. Pat. No. 6,330,057 B1 is an opto-electronic sensor arrangement which additionally ascertains the movement of the reflecting object, with the aid an interference pattern. However, the proposed device is also dependent on distance and consequently does not permit a flexible application.

Other known movement sensors are based on cameras; these cameras are relatively expensive, however. Particularly in the monitoring of products manufactured in an automatic process—for example, those moving through a number of stations on conveyor belts—it is necessary to have both a control for presence and a control for movement, and these controls should be cost-effective due to the high number of monitoring points that are required.

The goal of the invention is to provide an opto-electronic sensor arrangement which detects both the presence of an object and its movement in a light barrier and which can be employed flexibly and in a simple and cost-effective manner.

This goal is achieved by a device according to claim 1 or 2 and a process according to claim 11.

The opto-electronic sensor arrangement according to the invention exhibits an optical transmitter and an optical receiver which are so positioned relative to each that they either form a light scanner designed as a light scanner with background gating or form a reflecting light barrier in conjunction with a reflector. In the case of a light scanner, the optical receiver exhibits a plurality of receiving elements, at least one of which receives radiation from its immediate vicinity and at least one of which receives radiation from a distance. The signals received by the receiving elements can be evaluated in such a way that signals coming from objects beyond a certain distance are suppressed. The opto-electronic sensor arrangement thereby functions as an optical sensor with background gating. In the case of a reflecting light barrier, the light beam emitted by the optical transmitter and the light beam detected by the optical receiver run almost parallel, so that the sensor arrangement is independent of distance in large areas. The smaller the angle of intersection between the light beam emitted by the optical transmitter and that detected by the optical receiver, the greater is the independence of distance. If the two light beams run parallel to each and the optical transmitter and receiver are positioned, e.g., concentrically, then the two are auto-collimated and basically operate independent of distance. This is essential particularly when the application is in the domain of automation technology, since it permits the sensor arrangement to be employed at various positions without an exact adjustment with respect to spacing.

The optical receiver also exhibits a detector, in which successive images of the light beam reflected by an object are detected; these images are then compared in an evaluating unit connected to the detector, so that the outcome of the comparison may provide information on the movement of the object relative to the optical receiver. Thus the sensor arrangement functioning as a light scanner or reflecting light barrier also exhibits a motion detector, and the presence of an object and the movement of that object can be detected simultaneously.

The detector usefully exhibits a CCD chip, with which successive images of the light beam reflected by the object can be detected with special ease, and passed on to the evaluating unit.

In a particularly preferred embodiment of the invention the detector takes the form of a mouse sensor, since the detectors used in so-called optical mice for light emitted by an optical transmitted and reflected by a table top, or the like, are specially calibrated to determine the movement of the so-called optical mouse relative to the table top and thus are particularly suited for motion detection.

The detector belonging to the optical receptor will chiefly assume the function of the light scanner, so that only one detector is required for monitoring both the presence and the movement of an object. To this end, the detector's image area for monitoring movement can either incorporate the image area of the detector in its function as optical scanner, or it may overlap the latter image area. In the first case, movement is detected as a primary feature, while in the second case the presence of an object is detected as the primary feature and movement as the subordinate feature, since the overlapping area assumes two functions, while the larger area then has only a single function. However, it is also possible for the image areas of the detector in its functions as optical scanner and as motion detector to be identical. To permit the evaluation of the signals in every case, the detector is connected to a control circuit, which exhibits a functional circuit for optical scanning, to operate the detector in its function as optical scanner, and a functional circuit for movement, to operate the detector in its movement function. The control circuit also has a switch for moving between the optical scanning function and the movement function. The two functions are thus electronically separated.

In an alternative embodiment, there can be a second detector which exercises the optical scanning function, in addition to the detector in the optical receiver. The received signals can be appropriately processed by means of the evaluating units connected to the two detectors, and these units may take the form of a single evaluating unit. However, so that both detectors receive the signals from the detected object, a beam splitter is provided which guides the light beam reflected by the object to the first and second detectors, either simultaneously or in alternating form. This provides optical separation between the two signal evaluating capabilities.

If the optical transmitter and optical receiver are so positioned that in conjunction with a reflector they form a reflecting light barrier, a particularly advantageous elaboration of the invention provides for a polarizing filter to be positioned in front of the optical transmitter and/or in front of the optical receiver, such that the polarizing directions of the two polarizing filters are perpendicular to each other. Precisely in the case of objects which are either highly reflective or transparent, and particularly those made of foil, a variable surface reflection is produced in the detector due to the waviness of the material, and this can lead to faulty multiple switching in the sensor arrangement. Moreover, transparent foils create a problem of detection due to their high transmission properties. Transparent foils also pose a problem when the detector records a plurality of reflections due to voltage birefringence. Thus if a transparent foil moves through a reflecting light barrier, there is a danger that the light beam will not be interrupted and the foil will remain undetected. When the detector possessing a movement function is used in combination with the polarizing filters, it is possible to detect a movement pattern produced by the waviness of the foil. Thus the device according to the invention specifically provides for the reliable detection of transparent objects that are highly reflective.

The sensor arrangement is chiefly used for detecting the movement of objects in motion, particularly objects in continuous motion, and particularly flat objects, such as fabric webs, foil webs, sheet metals, or paper webs, and more particularly transparent or reflective foil webs. The sensor arrangement can therefore be installed in the most varied kinds of automated devices, in which objects, particularly flat objects, and more particularly, transparent or reflective objects, are monitored, specifically for presence and movement. For example, highly reflective packages, such as those containing vacuum-packed coffee, can be reliably detected with the sensor according to the invention and monitored for movement, particularly for a desired speed and direction.

In the inventive process for detecting the presence and movement of an object a light beam transmitted from an optical transmitter belonging to an opto-electronic sensor arrangement is reflected by an object and detected in an optical receiver. The optical transmitter and the optical receiver are so positioned that they either form a light scanner designed as a light scanner with background gating or form a reflecting light barrier in conjunction with a reflector. Successive images of the light beam reflected by an object are detected by a detector belonging to the optical receiver and are compared in an evaluating unit connected to the detector, so that the outcome of a comparison provides information on the movement of the object relative to the optical receiver.

In a particularly preferred function performed by the process the direction of motion is ascertained by the evaluating unit, and this allows the sensor operation to release a signal only when the objects being monitored are moving at a specific speed or when those objects deviate from a predetermined speed.

It is also preferred that the speed of movement is ascertained in the evaluating unit, so that the sensor arrangement only releases a switching signal when a predetermined speed is reached by the objects being monitored or when there is a deviation from the predetermined speed.

In a particularly preferred embodiment of the invention the optical transmitter takes the form of a laser, so that a pattern of speckles forms on the object and these speckles are detected by the optical receiver, in addition to or in place of the image of the object, and can be taken into account, in the form of successive images, in determining the object's motion. This particularly facilitates the detection of objects with a smooth surface.

In an advantageous elaboration of the process the object being monitored is provided with an identifying marking, particularly a coded marking, so that when the object passes along the sensor arrangement the marking, specifically the coded marking, can be read off, to thereby provide further information on the moving object and increase the ability to identify the object. The marking may consist of a reflective foil, particularly a retroreflective foil. This foil reliably reflects into the optical receiver the light falling on the object and on the marking, and enhances the contrast of the reflection from the object.

The invention is next explained in detail on the basis of an exemplary embodiment. Shown is:

FIG. 1 a schematic view of an exemplary embodiment of an opto-electronic sensor arrangement in the form of a reflecting light barrier.

FIG. 1 depicts a sensor arrangement 10 with an optical transmitter 20 and an optical receiver 30. The optical transmitter 20 transmits a light beam 20a onto a reflector 60, where the emitted light beam 20a is reflected at an angle $\alpha$ to become the light beam 30a, which is detected in the optical receiver 30. The optical transmitter 20 and the optical receiver 30 are positioned immediately next to each other, and the image planes rest on the same plane, so that the sensor arrangement is virtually auto-collimated. The emitted light beam 20a and the detected light beam 30a run at a very small angle $\alpha$; in particular, the emitted light beam 20a and the detected light beam 30a may run in parallel fashion. In an alternative design, the optical sensor 20 and the optical receiver 30 are not positioned next to each in the sensor arrangement 10, but are positioned in concentric fashion. This arrangement of the optical transmitter 20 and the optical receiver 30 means that the sensor arrangement 10 is almost independent of distance, since the light beam 30a reflected by the reflector 60 is in any case reflected into the optical receiver 30 independent of the distance between the reflector 60 and the sensor arrangement 10. Thus both the light reflected from the reflector 60 and the light reflected from an object 50 which moves between the sensor arrangement 10 and the reflector 60 and which passes through the light beams 20a, 30a can be reliably detected by the sensor arrangement 10.

The optical transmitter 20 exhibits a light source 22, whose light is focused by a lens 21. Positioned in front of the lens 21 and the light source 22 is a polarizing filter 25, which polarizes the light emitted from the light source in a polarizing direction 'a', as indicated by the arrow in FIG. 1. The polarizing direction 'a' runs basically perpendicular to the paper plane.

If the object 50 is located between the sensor arrangement 10 and the reflector 60, the object 50 blocks the optical path. Depending on the shape of the object, the emitted light beam 20a will be reflected by the object 50 to some degree; or the beam 20a will pass through the object 50, if the latter is transparent.

The optical receiver 30 exhibits a detector 32, which has a CCD chip 33 positioned in the image plane of lens 31, as well as an evaluating unit 36 positioned further on. A more or less sharp image of the object 50 results if the receiver's optical system, i.e., lens 31, has a fixed focus or an auto focus, i.e., provides automatic tracking. Positioned in front of lens 31 is another polarizing filter 35, whose the polarizing direction 'b' (also indicated by an arrow in FIG. 1) runs perpendicular to the polarizing direction 'a' of filter 25 and basically lies on the paper plane. The light beam 30a reflected from the object 50 is thus able to pass through the polarizing filter 35 and is detected in the CCD chip 33. In time-staggered fashion the CCD chip 33 receives a number of images of the light beam 30a reflected by the object 50, and these images are evaluated in the evaluating unit 36. Through a comparison of successive images performed according to an evaluating algorithm, e.g., one known from the sensors in optical mice, the detector 32 can determine the direction in which the object is moving, as well as its speed of movement. The use of a mouse sensor as a detector particularly assures that the movement of object 35 is reliably detected, specifically with respect to direction and speed.

The use of the polarizing filters 25, 35 permits the sensor arrangement 10 to reliably detect objects that are unusually difficult to register, particularly transparent or reflecting objects 50.

The detector 32 is able to assume the movement function and the function of a light scanner simultaneously. To this end, the image areas for the movement function and the light scanner function can either be distinct or can partially overlap. It is also possible to choose image areas of equal size and to alternately detect signals for evaluating the object's motion and signals for identifying the presence of the object 50, namely by means of an electronic control circuit which exhibits one circuit for operating the detector 32 in the movement function and another circuit for operating the detector 32 as an optical scanner. As a further alternative, a second detector (not depicted), which assumes the light scanning function, can be positioned in the optical receiver 30, in addition to detector 32, which then assumes only the movement function. The second detector may operate with complete independence of detector 32, and the detected signals can be evaluated by the common evaluating unit 36; or the two detectors may take the form of different areas on a CCD chip. So that both detectors are able to detect the reflected light beam 30a, an optical beam splitter is provided, which guides the reflected light beam 30a to both detectors, either simultaneously or in alternating fashion.

Moreover, the object 50 may be provided with a marking, particularly a coded marking, so that it is possible to distinguish objects moving in succession or to obtain additional information on the objects. The marking may advantageously take the form of a reflective foil, particularly a retroreflective foil, in order to enhance the reflective contrast between the object 50 and the marking, as well as to insure that the emitted light beam 20a is reflected into the optical receiver 30.

LIST OF REFERENCE NUMERALS

10 sensor arrangement
20 optical transmitter
20a emitted light beam
21 lens
22 light source
25 polarizing filter
30 optical receiver
30a detected light beam
31 lens
32 detector
33 CCD chip
35 polarizing filter
36 evaluating unit
50 object
60 reflector
α angle
a direction of polarization
b direction of polarization

The invention claimed is:

1. Opto-electronic sensor arrangement, with an optical transmitter and an optical receiver which are positioned relative to each other so as to create an optical scanner which takes the form of an optical scanner with a background gating function, such that the optical receiver has a detector in which successive images of the light beam reflected from the object are detected and are compared in an evaluating unit, and the outcome of the comparison provides information on the movement of the object relative to the optical receiver, with the result that the detector exercises a movement function wherein the detector exercises an optical scanning function and the detector is connected to a control circuit, which has a functional circuit for optical scanning, in order to operate the detector in its function as optical scanner, and a functional circuit for movement, in order to operate the detector in its movement function, and has a switch for moving between the optical scanning function and the movement function.

2. Opto-electronic sensor arrangement, with an optical transmitter and an optical receiver which are positioned relative to each other so as to form a reflecting light barrier in conjunction with a reflector, such that the optical receiver has a detector in which successive images of the light beam reflected from the object are detected and are compared in an evaluating unit, and the outcome of the comparison provides information on the movement of the object relative to the optical receiver, with the result that the detector exercises a movement function wherein the detector exercises an optical scanning function and the detector is connected to a control circuit, which has a functional circuit for optical scanning, in order to operate the detector in its function as optical scanner, and a functional circuit for movement, in order to operate the detector in its movement function, and has a switch for moving between the optical scanning function and the movement function.

3. Sensor arrangement according to claim 2, wherein a polarizing filter is positioned in front of the optical transmitter and/or in front of the optical receiver.

4. Sensor arrangement according to claim 2, wherein a polarizing filter is positioned both in front of the optical transmitter and in front of the optical receiver, such that the polarizing directions of the two polarizing filters run perpendicular to each other.

5. Sensor arrangement according to claim 1, wherein the optical receiver exhibits, in addition to the detector, a second detector, which exercises an optical scanning function, while an optical beam splitter is provided which guides the reflected light beam to the detector and to the second detector, either simultaneously or in alternating fashion.

6. Sensor arrangement according to claim 1, wherein the detector exhibits a CCD chip.

7. Sensor arrangement according to claim 1, wherein the optical transmitter takes the form of a laser.

8. Sensor arrangement according to claim 7, wherein the speckles created by the laser light are taken into account by the evaluating unit in its comparison of the images of the light beam reflected from an object.

9. Use of a sensor arrangement according to claim 1 to detect the motion of moving objects, specifically flat objects, such as fabric webs, foil webs, sheet metals, paper webs, or transparent or reflective foil webs.

10. Process for detecting the presence and movement of an object, where a light beam emitted from the optical transmitter of an opto-electronic sensor arrangement is reflected from the object and detected in an optical receiver, such that the optical transmitter and the optical receiver are so positioned that they either form a light scanner in the form of a light scanner with a background gating function or form a reflecting light barrier in conjunction with a reflector, and such that the optical receiver exhibits a detector in which successive images of the light beam reflected by the object are detected and are compared in an evaluating unit, such that the outcome of the comparison provides information on the movement of the object relative to the optical receiver
wherein
the object is provided with a distinguishing marking comprising a reflective foil.

11. Process according to claim 10,
wherein
the direction of motion is ascertained in the evaluating unit.

12. Process according to claim 10,
wherein
the speed of motion is ascertained in the evaluating unit.

13. Process according to claim 10,
wherein
the optical transmitter takes the form of a laser and the speckles created by the laser light are taken into account by the evaluating unit in its comparison of the images of the light beam reflected from an object.

14. Sensor arrangement according to claim 3,
wherein
a polarizing filter is positioned both in front of the optical transmitter and in front of the optical receiver, such that the polarizing directions of the two polarizing filters run perpendicular to each other.

15. Sensor arrangement according to claim 4,
wherein
the optical receiver exhibits, in addition to the detector, a second detector, which exercises an optical scanning function, while an optical beam splitter is provided which guides the reflected light beam to the detector and to the second detector, either simultaneously or in alternating fashion.

16. Process according to claim 11,
wherein
the speed of motion is ascertained in the evaluating unit.

17. Use of a sensor arrangement according to claim 1 to detect the motion of continuously moving objects, specifically flat objects, such as fabric webs, foil webs, sheet metals, paper webs, or transparent or reflective foil webs.

18. Process for detecting the presence and movement of an object, where a light beam emitted from the optical transmitter of an opto-electronic sensor arrangement is reflected from the object and detected in an optical receiver, such that the optical transmitter and the optical receiver are so positioned that they either form a light scanner in the form of a light scanner with a background gating function or form a reflecting light barrier in conjunction with a reflector, and such that the optical receiver exhibits a detector in which successive images of the light beam reflected by the object are detected and are compared in an evaluating unit, such that the outcome of the comparison provides information on the movement of the object relative to the optical receiver,
wherein
the object is provided with a distinguishing marking comprising a retroreflective foil.

19. Process according to claim 10,
wherein
the object is provided with a coded distinguishing marking.

20. Process according to claim 18,
wherein
the object is provided with a coded distinguishing marking.

21. Process according to claim 20,
wherein
the optical transmitter takes the form of a laser and the speckles created by the laser light are taken into account by the evaluating unit in its comparison of the images of the light beam reflected from an object.

22. Process according to claim 18,
wherein
at least one of the direction and speed of motion is ascertained in the evaluating unit.

23. Process according to claim 22,
wherein
the optical transmitter takes the form of a laser and the speckles created by the laser light are taken into account by the evaluating unit in its comparison of the images of the light beam reflected from an object.

24. Process according to claim 18,
wherein
the optical transmitter takes the form of a laser and the speckles created by the laser light are taken into account by the evaluating unit in its comparison of the images of the light beam reflected from an object.

\* \* \* \* \*